UNITED STATES PATENT OFFICE.

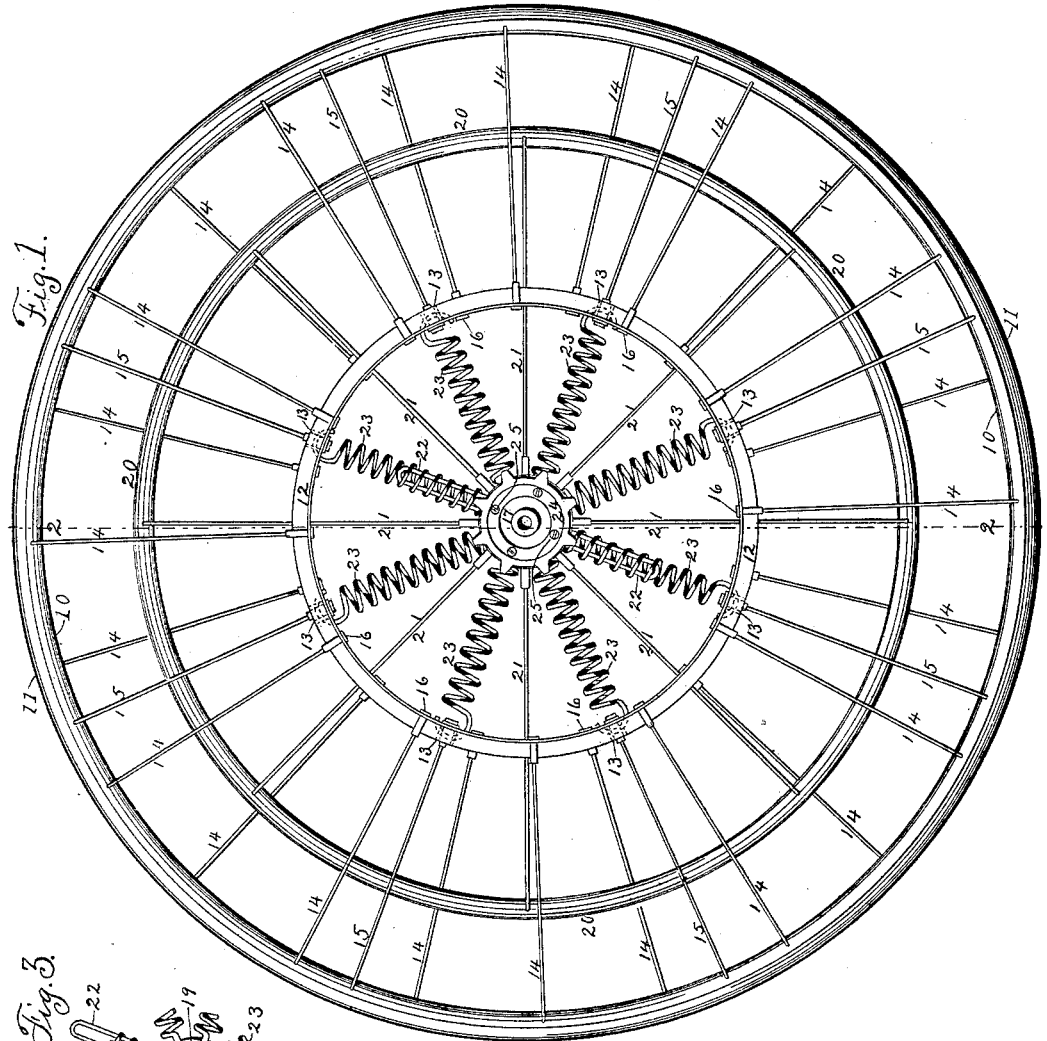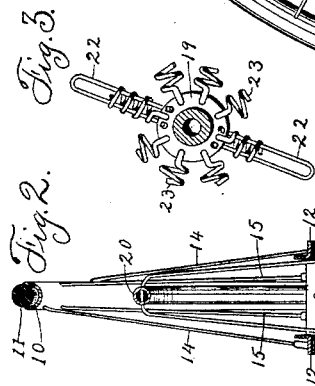

JACOB H. PETERSON, OF DES MOINES, IOWA.

ELASTIC WHEEL.

SPECIFICATION forming part of Letters Patent No. 586,566, dated July 20, 1897.

Application filed March 12, 1897. Serial No. 627,099. (No model.)

*To all whom it may concern:*

Be it known that I, JACOB H. PETERSON, residing at Des Moines, in the county of Polk and State of Iowa, have invented a new and useful Elastic Wheel for Bicycles, &c., of which the following is a specification.

The object of this invention is to provide a vehicle-wheel of strong and durable construction having a substantially solid tire, with means whereby the vibrations attendant upon the passage of the wheel over rough and uneven roads will not be transmitted to the axle of the wheel, and my object is, further, to provide a driving-wheel for bicycles and the like in which power is stored in the cushioning-springs of the wheel upon the downward stroke of the pedals, so that the springs will actuate to advance the vehicle-wheels a slight distance after the pedals have finished their effective stroke to thereby facilitate hill-climbing and the attainment of great speed.

My invention consists in certain details in the construction, arrangement, and combination of the various parts of the wheel, and particularly in the arrangement within a solid wheel of a rim rotatable relative to the wheel, and a series of springs for connecting the rim with the axle to thereby limit the movement of the rotatable rim and to cushion the wheel, as hereinafter more fully and particularly set forth, pointed out in my claims, and illustrated in the accompanying drawings, in which—

Figure 1 shows a side elevation of the complete wheel. Fig. 2 shows a vertical transverse sectional view taken through the line 2 2 of Fig. 1. Fig. 3 shows a detail sectional view through the line 3 3 of Fig. 2.

Referring to the accompanying drawings, the reference-numeral 10 is used to indicate a rim having a tire 11 secured therein.

The reference-numeral 12 indicates a double rim made of L-shape metal bars and connected at equal distances by means of the U-shaped cross-pieces 13. Spokes 14 serve to connect the rims 12 with the rim 10. In addition to these spokes I have provided a series of guide-rods 15, extended from the rim 10 to the cross-pieces 13 and running in parallel planes close to each other. I employ screw-nipples 16 for connecting the said spokes and guide-rods with the said rim and cross-pieces thereof.

The reference-numeral 17 is used to indicate a hub having flanges 18 at its ends and a flange 19 at its central portion.

The reference-numeral 20 indicates a rim of smaller diameter than the rim 10, designed to pass between the guides 15 and to be capable of a slight rotary movement relative to the rim 10 and also a slight up-and-down movement within the guides 15. A series of spokes 21 connect the flanges 18 of the hub with the said rim 20. I have fixed to the flange 19 of the hub two arms 22 to project outwardly therefrom, and the reference-numeral 23 indicates contractile springs having hooks formed on their ends and connected with the central portions of the cross-pieces 13 and also with the flange 19. The aforesaid arms 22 on the hub are extended part way through two of these springs.

Power is applied to rotate the wheel through the means of a sprocket-wheel 24, connected with one of the flanges 18 by means of the bolts 25, or in any suitable way.

In practical operation it is obvious that when a weight is applied to the hub the spring above the central line will be compressed and the hub may move downwardly a slight distance relative to the rims 12, and when the wheel is in motion in passing over a raised obstruction on the surface the rim 10 may be elevated and the wheel passed over the obstruction before the hub is elevated. Hence the vibrations caused by running over an uneven ground or surface will not be transmitted to the hub of the wheel. However, the hub is held rigidly in line with the rim of the wheel by means of the guides 15 and the rim 20. Furthermore, in transmitting power to the sprocket-wheel 24 it is obvious that a hard pull upon the sprocket-wheel in one direction will tend to rotate the axle a slight distance against the pressure of all the springs. This pressure will be particularly applied to those springs into which the arms 22 are inserted. However, the sprocket-wheel may rotate a limited distance within the wheel proper when a strong power is applied thereto, and then the springs will tend to return the sprocket to its normal position and will thereby aid in advancing the wheel even though the sprocket is only held stationary. Hence in climbing hills the rider may store a certain amount of power in the springs upon the downward movement of the pedals, and this power will tend to rotate the wheels when the pedal has reached the limit of its effective stroke.

Having thus described my invention, what I claim as new therein, and desire to secure by Letters Patent of the United States therefor, is—

1. A vehicle-wheel, comprising an outer rim, a second double rim arranged within and concentrically of the first, spokes connecting the outer rim and the double rim, a hub, a third rim mounted within the spokes of the other rims and capable of a rotary movement relative thereto, and springs for connecting the said hub and the double rim, for the purposes stated.

2. A vehicle-wheel, comprising an outer rim, a double rim arranged within and concentrically of the first, and having cross-pieces for connecting them, spokes for connecting the outer rim and the double rims, guides fixed to the outer rim and to the cross-pieces of the double rims, a hub having two or more outwardly-projecting arms at its central portion, a third rim arranged for rotation within the said guides, spokes for connecting the third rim with the hub, and a series of contractile springs connected with the said cross-pieces of the double rim and also with the said hub, and having the said extensions on the hub admitted into the central portion of two or more of the springs, substantially as and for the purposes stated.

JACOB H. PETERSON.

Witnesses:
  J. A. BRAMHALL,
  THOMAS G. ORWIG.